Figure 1:
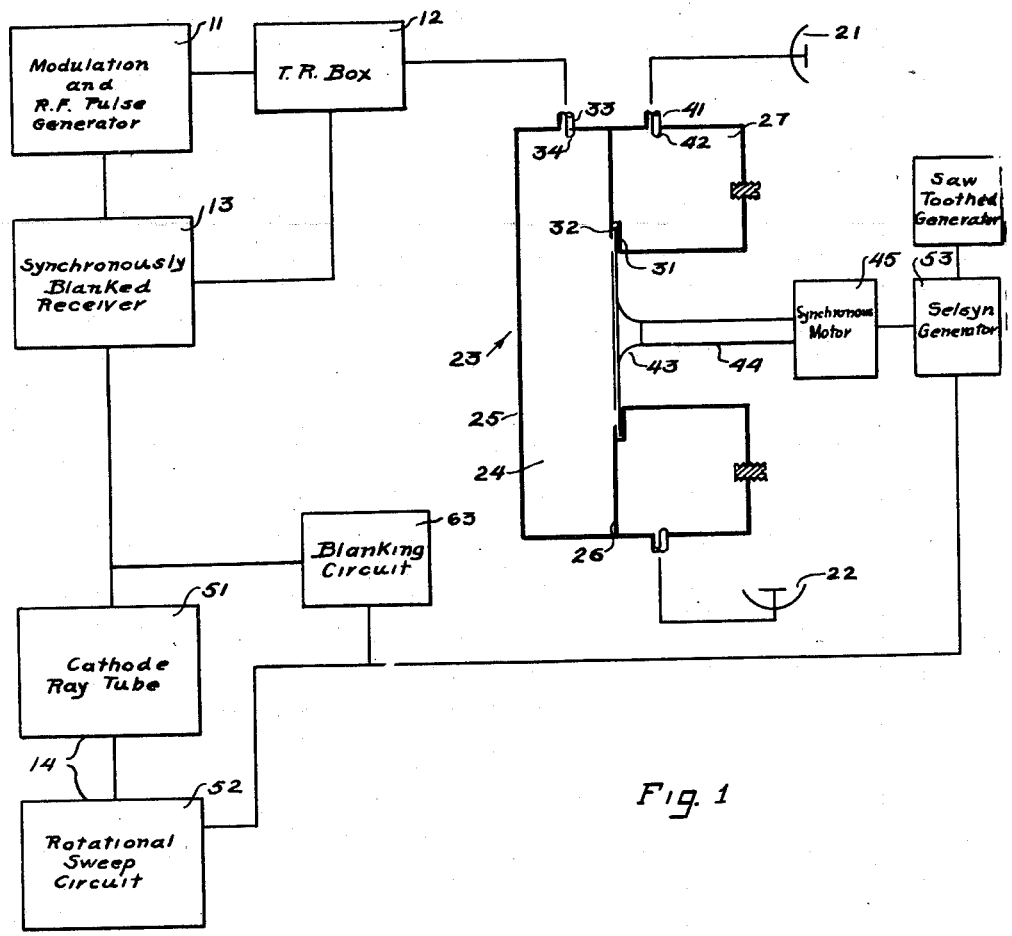

INVENTOR.
William H. Newbold, Dec'd
BY Hannah M. Newbold, Ex'trix

ATTORNEY

Patented Oct. 25, 1949

2,486,197

UNITED STATES PATENT OFFICE 2,486,197

THREE-DIMENSIONAL PROXIMITY INDICATION SYSTEM

William H. Newbold, deceased, late of Langhorn, Pa., by Hannah M. Newbold, executrix, Langhorn, Pa., assignor, by mesne assignments, to Philco Corporation, Philadelphia, Pa., a corporation of Pennsylvania Application August 3, 1944, Serial No. 547,900

2 Claims. (Cl. 343—11)

This invention relates in general to the field of ultra-high frequency signalling, and more particularly concerns a novel improved radar proximity indicator.

Generally, in radar detection systems, a succession of high energy impulses is transmitted in a directional manner from a suitable antenna structure. Upon striking an object, a signal reflection is produced which returns to the aforementioned antenna and registers upon a suitable indicating device. The time lapse between the transmission of an impulse and the receipt of an echo signal is taken as a measure of the distance between transmitter and reflecting object.

As it is often desirable for the radar apparatus to scan the horizon for reflecting objects, the directional antenna structure is suitably rotated by a synchronous motor at a comparatively low speed. The synchronous drive motor is geared to a Selsyn arrangement which in turn develops a voltage applied to the synchronous deflecting circuits of a cathode ray tube employed as the indicating device.

The deflecting circuits for such radar systems comprise essentially radial sweeps. Thus, in rotational scanning devices, the cathode ray spot starts at the center of the screen and sweeps radially outward and returns. The next sweep is also radial but at a slightly displaced angle. By synchronizing the rotatable antenna and the rotational scanning circuit, the exact azimuth location of an object on the horizon is readily indicated upon the screen. Obviously, the conventional system described above is limited to two dimensional radar proximity determination. That is to say, the cathode ray screen will show the location of objects in a single plane.

The present invention contemplates a radar proximity indicator comprising essentially a single cathode ray tube which will provide three dimensional proximity indications. The radar system to be utilized in connection with the three dimensional indicating systems has been described in detail in co-pending application Serial No. 547,899, of even date, now Patent No. 2,471,888, granted May 31, 1949. Briefly, however, this three dimensional radar system operates with fixed antenna structures, and may be utilized upon aircraft to provide indications of the presence of objects in the entire surrounding space region.

The radar system utilizes essentially six fixed antenna structures erected respectively up; down; front; rear; right and left. These structures are connected to a conventional radar generating and receiving apparatus (such as the one described by W. E. Moulic in "Electronic Industries" for May, 1945, pages 76 et seq.) through an ultra-high frequency selector switch. Through the agency of this switch, the radar impulses are radiated and received successively from different antenna structures.

In accordance with the present invention, the radar reflections received by any of the six fixed antenna structures are indicated upon a cathode ray screen so that the system operator may readily determine the direction and distance to a reflecting object. In other words, all six directional indications are simultaneously presented upon the face of a single cathode ray tube in a manner which causes no confusion whatsoever in determination of the range and bearing of the reflecting object.

The three dimensional proximity indicating system of the invention requires very little additional electrical apparatus over conventional radar proximity circuits. The rotation of the radial cathode ray deflection sweep circuit is synchronized with the rotary antenna selector switch. The antenna structures are connected to the rotary switch in a predetermined sequence with relation to the cathode ray tube so that whenever a particular directional antenna is in operation the radial sweep is operative along an axis suitably labeled to indicate that portion of space which is being scanned.

A blanking signal may be applied as an intensity modulation to the cathode ray tube and is synchronized so that the cathode ray tube surface is blanked out in the spaces between six scanning axes each 60° apart. To this end, the blanking signal utilized to divide the cathode ray screen surface into six distinct axes 60° apart is synchronized with the sixth harmonic of the rotational speed of the selector switch. That is to say, it is synchronized with the rate at which individual antennae are switched. Thus, through the utilization of a plurality of fixed antenna structures, a three-dimensional space region surrounding the radar apparatus may be scanned.

The proximity information normally determined by radar apparatus is in accordance with the present invention presented upon a cathode ray tube so that an operator may immediately determine from this single screen the spacial relationship of the reflecting object.

It is therefore an object of this invention to provide a proximity indicator for conveniently and accurately presenting three-dimensional information.

Another object of this invention is to provide a single cathode ray proximity indicator presenting three-dimensional proximity information.

A further object of this invention is to provide a three-dimensional radar system indicating upon six radial axes of a single cathode ray tube.

A further object of this invention is to provide a cathode ray scanning system for dividing the screen into six distinct scanning axes.

Figure 2:
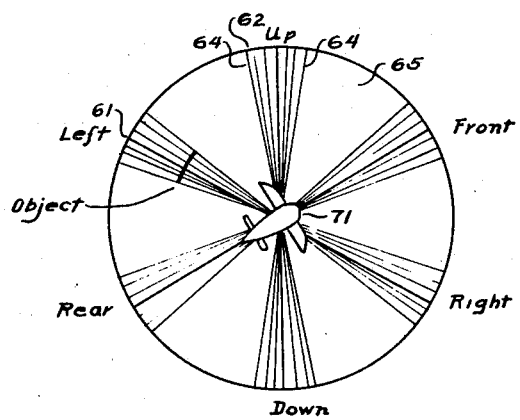

These and other objects of this invention will now become apparent from the following specification taken in connection with the accompanying drawings in which:

Figure 1 is a schematic block diagram of the complete dimensional proximity indicating systems; and Figure 2 is a representation of a cathode ray screen utilized for representing three-dimensional proximity indications.

Referring now to Figure 1, there is shown in block form a conventional radar signalling system. This type of apparatus, as is well understood in the art, comprises essentially a modulator and ultra-high frequency pulse generator 11.

The signal generated in the circuit 11 comprises essentially high energy ultra-high frequency impulses. The pulse frequency is of the order of 1000 cycles per second. These impulses are applied through TR box 12 to directional radiating antenna structures which will be described in greater detail later.

The radiated energy upon striking a solid object causes an electrical reflection which travels back to the radiating structure and returns through the TR box 12 to a synchronous receiver 13. Basically, the TR box 12 functions as a switching element to preclude the direct application of the high energy impulses generated in 11 to the receiving circuits 13. For further description of the TR box 12, refer to W. E. Moulic's article, "Operational elements of a radar system," Electronic Industries, pages 76 et seq., May, 1945, especially page 79, Figure 9.

The output of the receiver circuit 13 is applied to a synchronous indicating circuit 14. If the radar system of this invention is to be utilized on aircraft, then six fixed antenna structures of the type illustrated by schematic directional antennae 21 and 22 are mounted upon the aircraft in such a manner that radiation therefrom will completely cover the space region surrounding the aircraft. Thus, it is preferred to utilize antenna structures such as 21 and 22 having a 90° space beam pattern. Six of these antenna structures are mounted upon the aircraft, one of each directed up; down; right; left; front and rear. In this manner, all space surrounding the aircraft is completely covered by radiated radar signals.

As indicated in Figure 1, the six antenna structures, two of which 21 and 22 are actually illustrated, are connected in succession to a rotary high frequency selector switch 23, more particularly described in a co-pending application Serial No. 547,898 of even date, now abandoned. Briefly, however, the circuit selector switch 23 will be described in connection with the schematic representation thereof given in Figure 1. Essentially, the selector switch 23 comprises a primary cavity resonator 24 cylindrical in form and covered by a lower circular metallic plate 25 and an upper circular metallic plate 26. Disposed around the surface of the upper metallic plate 26 are, for the apparatus herein described, six secondary cavity resonators such as 27. These secondary resonators are also cylindrical in form and are secured directly to the upper metal plate 26 and the cavity resonator 24. A notch 31 is cut into the cylindrical wall of each cavity resonator 27, and, as illustrated, the upper metallic plate has an aperture at 32 which is directly beneath the notched portion 31 of the cavity resonator 27.

The output of the TR box 12 is coupled directly to the primary cavity resonator 24 by means of a co-axial coupler 33 and its associated loop 34.

The electro-magnetic field established within the cavity resonator 24 is coupled to the individual cavity resonators 27 through the apertures 32. The fields within the individual resonators 27 are coupled to their respective antenna structures such as 21 or 22 or the like through co-axial couplers 41 and associated internal loop probes 42.

Switching of the individual antenna structures utilized is accomplished by selectively coupling the cavity resonators 27 to the primary cavity 24. Thus, a rotary vane 43 secured to a drive shaft 44 extending from a synchronous drive motor 45 is operative in the space between the upper metallic plate 26 and the notches 31 of the secondary cavity resonator. The vane 43 comprises essentially a thin highly conductive metallic member which is perforated at a point on the periphery thereof so that during rotation, the perforations 32 are successively uncovered so that the field within the primary resonator 24 may link with that within the cavities 27. The switching speed will of course depend upon the particular application of the radar apparatus illustrated. It is thus evident that operation of the synchronous motor 45 at a time when the radar apparatus 11, 12 and 13 is in operation will cause selective signal radiation from the fixed antenna structures previously described in a predetermined order. If the speed of rotation of the synchronous motor and vane 43 is low compared to a thousand cycles per second, then each antenna structure such as 21 or 22 will radiate and receive a plurality of high frequency impulses.

In accordance with the invention, the received signal is applied from receiving circuits 13 to the indicator circuit 14 which in turn operates to apply the continuously received signals as an intensity modulation for the beam of the cathode ray tube 51.

The cathode ray tube 51 is of conventional design and is energized by a rotational sweep circuit 52 which is synchronized by the signal developed in the Selsyn generator 53 geared directly to the synchronous selector switch motor 45. The rotational sweep circuit 52 generates deflecting voltages which cause the cathode ray spot to deflect radially from the center to the edge of the screen surface. The next scanning line is also radial but the angle is advanced somewhat. In this manner, the radial scanning line appears to sweep circularly about the face of the cathode ray tube. In accordance with the invention, the rotational sweep generating circuits 52 result in a radial sweep operative at a circular speed equal to that of the metallic vane 43.

In operation of the radar system herein disclosed, the radial sweep will rotate synchronously with the selector switching vane 43. During that interval of time when the aperture in the perimeter of vane 43 travels over the corresponding perforation 32 in the metal plate 26, radar signals will be transmitted from one of the six antenna structures.

A suitable sawtooth generator 54, which is well known in the art, provides sawtooth voltages that may be directly impressed on the input circuit of the Selsyn generator 53 which, as is well known in the art, produces from said sawtooth voltages two voltages 90° displaced. Each of these two displaced voltages, after being amplified in the rotational sweep circuit 52, is applied to a pair of deflecting plates of the cathode ray tube 51, thus providing the rotational scanning of the electronic beam for said tube 51.

If during this same interval a reflecting object is located in the 90° beam pattern of the particular antenna radiating the impulse signals, then a reflection will be received in circuit 13 and applied as an intensity modulation to the cathode ray tube grid. This signal will thus appear on the radial sweep as a spot indicative of the presence of a reflecting object. The angular location of the radial sweep at the particular moment may be labeled in accordance with the particular antenna structure simultaneously operative.

As the aperture in the vane 43 passes beyond the corresponding aperture 32 in the metallic plate 36, signal radiation and reception from the corresponding antenna structures will cease. When the aperture in the vane 43 is opposite the corresponding aperture 32 for the next secondary cavity 27, radiation will again occur, this time from a different directional antenna, and received signals will be indicated by intensity modulation of the new radial sweep position. If the six secondary cavity resonators 27 are disposed at regular 60° intervals about the perimeter of the metallic plate 26, signals will be radiated from one of the fixed antenna structures such as 21 or 22 during each 60° rotation of the shaft 44.

Inasmuch as the radial rotational sweep of the cathode ray tube is synchronized with the vane rotation the radar information of objects in a particular direction will be presented in sectors 60° apart on the surface of the cathode ray tube screen as illustrated in Figure 2.

In order to avoid confusion with spurious signals tending to effect the intensity modulation between the 60° sectors such as 61 and 62, a blanking circuit 63 may be provided for the cathode ray circuit 51. The blanking circuit, which provides a blanking signal of rectangular wave form as is well known in the art, and, as described for example, in the co-pending application of C. E. Dolberg and R. G. Clapp, Serial Number 509,286, filed November 6, 1944, now Patent No. 2,427,523, granted September 16, 1947, is utilized to generate comparatively long rectangular blanking signals, the frequency of which corresponds to the rate at which the individual antenna structures are switched by the rotating vane 43; in other words, the sixth harmonic of the rotational speed of shaft 44. The blanking circuit output is applied directly to the cathode ray grid circuit along with the received radar reflection signals. The period between long blanking impulses is sufficiently long to permit a band of radial sweeps to appear on the tube as at 64 about the axis 62.

Thus, the face of the cathode ray tube will appear as in Figure 2 comprising essentially bands of radial sweeps separated by dark sectors such as 65 representing the period of blanking signal generation.

The six sweep axes spaced 60° apart are illustrated in Figure 2, and are preferably labeled upon the cathode ray screen as illustrated. The selector switch 23 is of course operative to switch the antenna structures covering the surrounding space in the rotational order corresponding to that illustrated for the cathode ray tube of Figure 2.

Various psychological factors may be added to the presentation illustrated in Figure 2 in order to readily adapt the radar system described to rapid interpretation. For example, a schematic representation of an airplane 71 may be placed at the center of the tube in such a manner that the appearance of a spot on any of the 60° axes will immediately present the operator with an indication of the distance to the reflecting object and the direction thereof.

It is thus evident that for the radar system hereinabove described there is no switching other than the comparatively simple continuous acting antenna switch 23. The returning echo signals are applied continuously to the cathode ray tube and provide without switching a fixed direction indication of nearby objects. Of course, other means may be utilized for presenting the fixed 60° space to time axes required for a complete indication of proximity in the entire space surrounding the aircraft. For example, a special cathode ray tube may be constructed with three sets of electro-static deflection plates mounted 120° out of phase with each other in space; or as an alternate, if magnetic deflection is desired, a special magnetic deflection yoke utilizing three coils similarly spaced may be constructed and mounted upon the stem of the cathode ray tube.

The latter two deflection systems would of course require switching. That is, each of the three deflecting circuits would require an individual sweep circuit operative during ⅓ of the total time. The switching may be accomplished readily by the synchronous motor driving the antenna selector switch 23.

The method of presentation, as illustrated in Figure 2, would of course be the same if the triplicate deflecting circuits were utilized. It is thus evident that this invention provides a novel means for presenting three-dimensional proximity indications upon a single cathode ray tube which information may rapidly be interpreted by the set operator. As various modifications of this presentation method may of course be evident to those skilled in the art, it is preferred not to be bound by the specific disclosures hereinabove set forth but by the appended claims.

What is claimed is:

1. In a proximity indicator system, a plurality of antenna structures, each having a predetermined space radiation pattern covering three-dimensional space about a point, a cathode ray tube divided into a plurality of sections corresponding to said antenna structures, each section representing a predetermined angle of space and totalling to all the space in a region about a point, indicators adjacent each section indicating the angle of space covered thereby, a deflecting circuit for said cathode ray tube for deflecting the cathode beam successively into each of said sections, means including circuit connections from said antenna structures to said cathode ray tube for modulating the cathode ray beam in accordance with a reflected signal from an object to be detected while in any one of said sections to provide an indication of the direction and distance to said object, and means for blanking out the cathode ray beam during deflection of the beam from one of said sections to the next adjacent section.

2. In a proximity indicator system, six fixed antenna structures facing respectively up, down, right, left, front and rear, and each having a 90° space beam pattern, and together covering all surrounding space; a cathode ray tube having a screen having six sections, one corresponding to each antenna and having points corresponding to all points up, down, right, left, front and rear in the several radiation patterns; and means including circuit connections whereby indications of signals received over each of said antenna structures is simultaneously indicated on the corresponding sections of the screen of said cathode ray tube; a cavity resonator individual to each of said antenna structures; an indicator; a main cavity resonator connected to said indicator; each of said individual cavity resonators having an aperture connection to said main cavity resonator; and a rotatable vane normally closing all but one of said apertures for successively coupling said main cavity to said individual cavities to sequentially electrically connect said antenna structures to said indicator.

HANNAH M. NEWBOLD,
*Executrix of the Last Will and Testament of William H. Newbold, Deceased.*

REFERENCES CITED

The following references are of record in the file of this patent:

UNITED STATES PATENTS

| Number | Name | Date |
| --- | --- | --- |
| 2,189,549 | Hershberger | Feb. 6, 1940 |
| 2,231,929 | Lyman | Feb. 18, 1941 |
| 2,401,432 | Luck | June 4, 1946 |
| 2,405,930 | Goldberg et al. | Aug. 13, 1946 |
| 2,412,703 | Wolff | Dec. 17, 1946 |
| 2,449,976 | Busignies | Sept. 28, 1948 |